(12) United States Patent
Shen

(10) Patent No.: US 9,377,809 B2
(45) Date of Patent: Jun. 28, 2016

(54) DISPLAY PANEL POSITIONING MEMBER AND DISPLAY APPARATUS

(71) Applicant: BOE TECHNOLOGY GROUP CO., LTD., Beijing (CN)

(72) Inventor: Zhiguo Shen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 89 days.

(21) Appl. No.: 14/518,392

(22) Filed: Oct. 20, 2014

(65) Prior Publication Data

US 2015/0382490 A1 Dec. 31, 2015

(30) Foreign Application Priority Data

Jun. 27, 2014 (CN) .......................... 2014 1 0302454

(51) Int. Cl.
*G06F 1/16* (2006.01)
*G02F 1/1333* (2006.01)

(52) U.S. Cl.
CPC ............ *G06F 1/16* (2013.01); *G02F 1/133308* (2013.01)

(58) Field of Classification Search
CPC ................ G06F 1/16; G02F 1/133608; G02F 2001/133322; A47B 81/06; H04N 5/645; H05K 2201/09145; H05K 2201/09181
See application file for complete search history.

(56) References Cited

U.S. PATENT DOCUMENTS

| | | | | | |
|---|---|---|---|---|---|
| 2005/0259191 | A1* | 11/2005 | Park | .................. | G02F 1/133308 349/58 |
| 2007/0115401 | A1* | 5/2007 | Tsubokura | ............ | G02F 1/1333 349/58 |
| 2008/0100769 | A1* | 5/2008 | Hsiao | ................. | G02F 1/133308 349/58 |
| 2011/0002112 | A1* | 1/2011 | Hsu | .................... | G02F 1/133308 361/829 |
| 2011/0157879 | A1* | 6/2011 | Chang | ....................... | F21S 9/03 362/183 |
| 2012/0262855 | A1* | 10/2012 | Park | ................... | G02F 1/133308 361/679.01 |
| 2013/0100370 | A1* | 4/2013 | Chen | ................. | G02F 1/133308 349/58 |
| 2013/0308074 | A1* | 11/2013 | Park | ..................... | G02B 6/0088 349/58 |
| 2015/0055316 | A1* | 2/2015 | Ye | ............................. | G02B 7/00 361/809 |
| 2015/0277131 | A1* | 10/2015 | Park | ................... | G02B 27/2221 349/58 |
| 2016/0054613 | A1* | 2/2016 | Lee | ................... | G02F 1/133308 362/97.2 |

FOREIGN PATENT DOCUMENTS

| CN | 101005739 A | 7/2007 |
|---|---|---|
| CN | 101169564 A | 4/2008 |
| CN | 101211046 A | 7/2008 |

(Continued)

OTHER PUBLICATIONS

First Office Action, including Search Report, for Chinese Patent Application No. 201410302454.4, dated Feb. 2, 2016, 13 pages.

*Primary Examiner* — Hoa C Nguyen
*Assistant Examiner* — Keith Depew
(74) *Attorney, Agent, or Firm* — Westman, Champlin & Koehler, P.A.

(57) ABSTRACT

The present invention discloses a display panel positioning member and a display apparatus. The display panel positioning member comprises a main body made of a shock absorbing material with a damping property, and a length direction of the main body is parallel to an inside face of an edge frame of the glue frame and an inside bottom face of the glue frame. The main body comprises a supporting portion provided between a light incidence face of the display panel and the glue frame, and a cushioning portion connected with the supporting portion and provided between a side of the display panel and the edge frame of the glue frame.

17 Claims, 3 Drawing Sheets

(56) References Cited

FOREIGN PATENT DOCUMENTS

| CN | 101598869 | A | 12/2009 |
| CN | 101949520 | A | 1/2011 |
| CN | 103822188 | A | 5/2014 |
| JP | 3998670 | A | 8/2007 |
| JP | 4059863 | A | 12/2007 |

* cited by examiner

DISPLAY PANEL POSITIONING MEMBER AND DISPLAY APPARATUS

CROSS-REFERENCE TO RELATED APPLICATION

This application claims the benefit of Chinese Patent Application No. 201410302454.4 filed on Jun. 27, 2014 in the State Intellectual Property Office of China, the whole disclosure of which is incorporated herein by reference.

BACKGROUND OF THE INVENTION

1. Field of the Invention

The present invention relates to the technical field of display, and more particular, to a display panel positioning member and a display apparatus.

2. Description of the Related Art

In the technical field of display, a resolution of a display panel is gradually improved to be higher and higher, and a visual angle of the display panel is gradually improved to be wider and wider. In assembling of a display apparatus, in order to guarantee display quality of the display apparatus, it is necessary to ensure a flatness of the display panel during mounting operation of the display panel, thereby preventing light leakage-caused malfunction and the like.

In the display apparatus, however, as the size of the display panel is gradually increased, tolerance ranges of respective components in the display apparatus are also increased, causing differences between the sizes of different regions in the respective components to be increased. Further, a coefficient of expansion of a glue frame of the display apparatus is different from that of the display panel. Therefore, it is necessary to provide a larger gap between the glue frame and the display panel during assembling of the display apparatus, so that the display panel can be mounted in the glue frame. However, in a case where the gap between the glue frame and the display panel is enlarged, when the display apparatus vibrates, a vibration displacement and an impact force formed between the display panel and sides of the glue frame become larger. Thus, the display apparatus is easily broken. Moreover, due to a longer distance of movement of the display panel, friction and tension may be caused between structures, such as shading strips, provided at the periphery of the display panel and the glue frame. As a result, the structures are likely to be broken or worn, or foreign substance-caused malfunction may occur, thereby causing display malfunction.

Therefore, how to improve stability and security of an assembly formed by assembling the display panel and the glue frame in the display apparatus is a problem urgently to be solved by a person skilled in the art.

SUMMARY OF THE INVENTION

In order to overcome or at least, in part, mitigate the above mentioned problems, the present invention provides a display panel positioning member and a display apparatus. With such display panel positioning member, stability and security of an assembly formed by assembling a display panel and a glue frame in the display apparatus can be improved.

According to an aspect of the present invention, there is provided a display panel positioning member for positioning a display panel with respect to a glue frame in a display apparatus, comprising a main body made of a shock absorbing material with a property of damping, a length direction of the main body being parallel to an inside face of an edge frame of the glue frame and an inside bottom face of the glue frame, wherein the main body comprises:

a supporting portion provided between a light incidence face of the display panel and the glue frame; and a cushioning portion connected with the supporting portion and provided between a side of the display panel and the edge frame of the glue frame.

According to another aspect of the present invention, there is provided a display apparatus, comprising a glue frame and a display panel, the glue frame having an inside bottom face which contacts with a light incidence face of the display panel, and edge frames of the glue frame having inside faces which face sides of the display panel. The display apparatus further comprises at least one display panel positioning members as described above, provided at the edge frames of the glue frame and between the glue frame and the display panel.

DETAILED DESCRIPTION OF EMBODIMENTS

Figure 1:
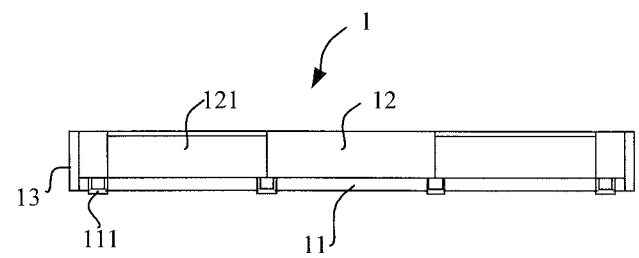
FIG. 1 is a front view of display panel positioning members according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
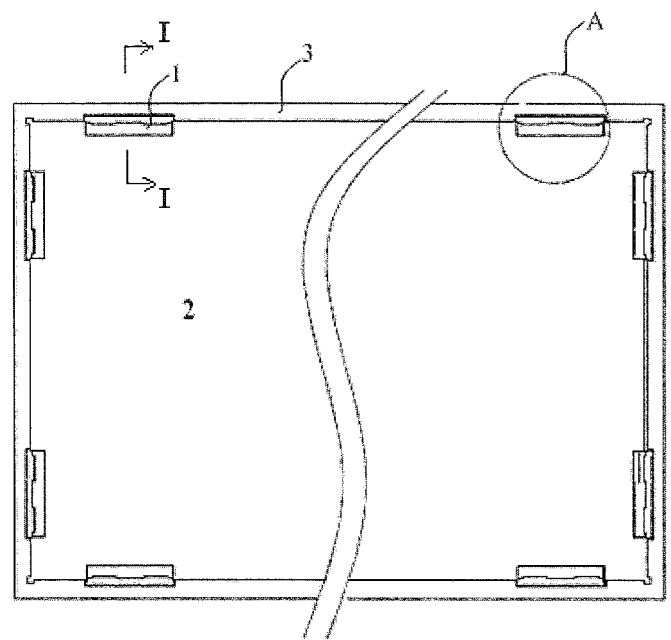
FIG. 4 is a schematic simplified view of a display apparatus according to an embodiment of the present invention, in which a display panel is provided in a glue frame by means of the display panel positioning members.
Figure 6:
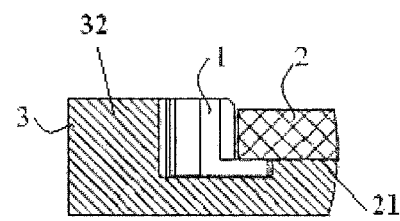
FIG. 6 is a partial and schematic view, in cross-section, taken along the I-I line in FIG. 4, showing a fitting state of the display panel positioning member, the display panel and the glue frame in the display apparatus according to an embodiment of the present invention.

With reference to FIGS. 4 and 6, FIG. 4 is a schematic simplified view of a display apparatus according to an embodiment of the present invention, in which a display panel is provided in a glue frame by means of display panel positioning members, and FIG. 6 is a partial and schematic view, in cross-section, taken along the I-I line in FIG. 4, showing a fitting state of the display panel positioning member, the display panel and the glue frame in the display apparatus according to an embodiment of the present invention.

The display apparatus according to the embodiment of the present invention comprises the glue frame 3 and the display panel 2. The glue frame 3 has a supporting face contacting with a light incidence face 21 of the display panel 2 (i.e., the inside bottom face of the glue frame) and stopping faces facing sides of the display panel 2 (i.e., the inside faces of edge frames 32 of the glue frame 3). The display apparatus according to the embodiment of the present invention further comprises at least one display panel positioning members 1 provided at the edge frames 32 of the glue frame 3 and between the glue frame and the display panel. By means of such display panel positioning members 1, after the display panel 2 and the glue frame 3 have been assembled, stability and security of the assembly can be improved. In a preferred embodiment, at each edge frame 32 of the glue frame 3, a plurality of display panel positioning members 1 are provided.

In an embodiment, at least one positioning member receiving grooves (not shown, covered by the display panel positioning members 1 in the Figs) are provided at the edge frames of the glue frame 3. The at least one display panel positioning members 1 are received in the at least one positioning member receiving grooves, respectively.

Figure 5:
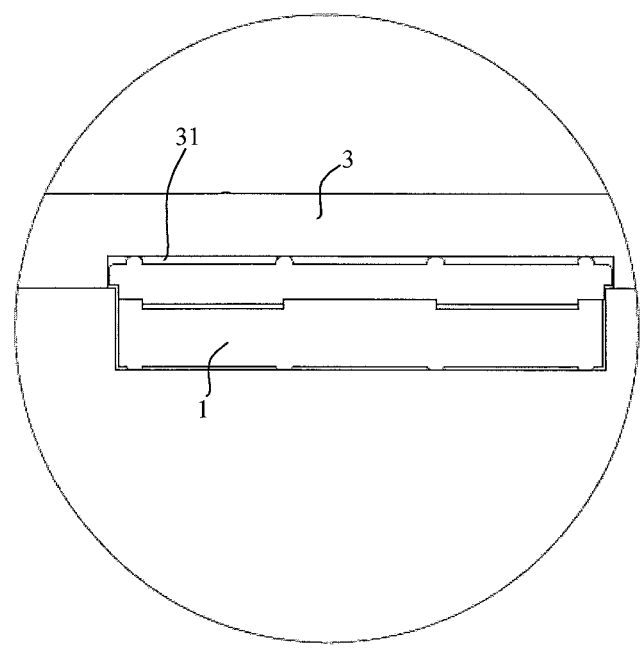
FIG. 5 is an enlarged view of A region indicated in FIG. 4.

With reference to FIGS. 1 and 4-5, the display panel positioning member 1 according to the embodiment of the present invention comprises a main body made of a shock absorbing material with a property of damping, preferably, with a property of high damping. The length direction of the main body is parallel to the stopping face of the glue frame 3 and is also parallel to the supporting face of the glue frame 3. Specifically, with reference to FIGS. 1-3, 6 and 7a, the main body of the display panel positioning member 1 comprises:

a supporting portion 11 provided between the light incidence face 21 of the display panel 2 and the glue frame 3; and a cushioning portion 12 connected with the supporting portion 11 and provided between a side of the display panel 2 and the glue frame 3.

The main body of the display panel positioning member 1 may be made of a shock absorbing material with a property of high damping. Furthermore, the supporting portion 11 is provided between the light incidence face 21 of the display panel 2 and the glue frame 3 in the display apparatus, and edges of the display panel 2 are disposed on the supporting portion 11. The surface of the supporting portion 11 contacting with the display panel 2 has a large friction damping. When the display apparatus vibrates, the supporting portion 11 can provide a large static friction damping for the display panel 2 and thus can provide a resistance to movement of the display panel 2 in the direction parallel to the light incidence face 21 of the display panel 2. In this way, after the display panel 2 and the glue frame 3 have been assembled, stability of the assembly can be improved. In a case where the display panel 2 is subject to a force in the direction parallel to the light incidence face 21 of the display panel 2 that is greater than the static friction damping provided by the supporting portion 11, the cushioning portion 12 of the display panel positioning member 1 can absorb impact or vibration energy caused by the display panel 2 through compression deformation of the cushioning portion 12, so that after the display panel 2 and the glue frame 3 have been assembled, security of the assembly can be improved.

Therefore, the display panel positioning member 1 according to the embodiment of the present invention can improve stability and security of the assembly formed by assembling the display panel 2 and the glue frame 3 in the display apparatus.

In an embodiment, the supporting member 11 and the cushioning portion 12 are connected to each other and form the main body having a substantially L-shaped cross-section.

Figure 2:
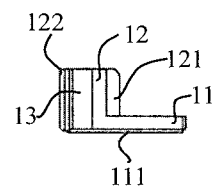
FIG. 2 is a left view of the display panel positioning members shown in FIG. 1.

In a preferred embodiment, as shown in FIGS. 1 and 2, at least one reinforcement ribs 111 are provided on the face of the supporting portion 11 of the display panel positioning member 1 facing away from the display panel 2. In a further preferred embodiment, a plurality of reinforcement ribs may be provided. More preferably, an extending direction of each reinforcement rib 111 is perpendicular to the length direction of the main body, and the plurality of reinforcement ribs 111 are uniformly distributed along the length direction of the main body.

The reinforcement rib 111 can improve flatness of the glue frame 3 and can improve flatness of the supporting face for supporting the display panel 2. In a case where a part of the glue frame 3 has a higher height than the rest of the glue frame 3, the reinforcement ribs 111 of the display panel positioning member 1 mounted on the glue frame 3 will be forced to be compressed under the action of the gravity of the display panel 2 or a pressure from a front frame of the display apparatus, so that the part of the glue frame 3 having the greater height is flush with the rest of the glue frame 3. Moreover, the supporting portion 11 provided with the reinforcement ribs 111 can enable it to supply a secondary vibration-absorbing protection for the display panel 2 so as to resist vibration in the direction perpendicular to the light incidence face 21 of the display panel 2.

Figure 3:
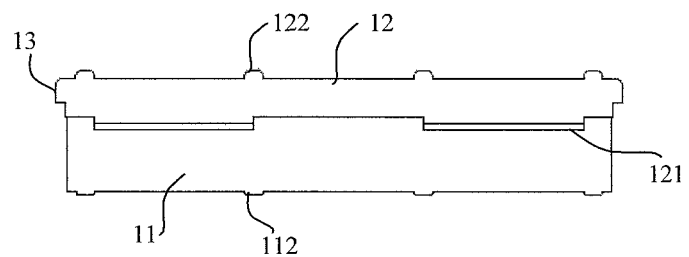
FIG. 3 is a top view of the display panel positioning members shown in FIG. 1.

As shown in FIGS. 2 and 3, in a preferred embodiment, at least one first cushioning projections 121 are formed on a surface of the cushioning portion 12 of the main body facing a side of the display panel 2, and the at least one first cushioning projections 121 protrude towards the side of the display panel 2.

When assembled, there is a gap between the first cushioning projection 121 provided on the cushioning portion 12 and the side of the display panel 2. In a case where the display panel 2 is moved by the force parallel to the light incidence face 21 of the display panel 2, when the first cushioning projection 121 is pressed by the display panel 2, the first cushioning projection 121 can absorb impact energy or vibration energy generated due to movement of the display panel 2 through its own compression deformation, so that a cushioning protection for the display panel 2 can be realized, thereby improving stability and security of the assembly formed by assembling the display panel 2 and the glue frame 3.

Preferably, the cushioning portion 12 is provided with a plurality of first cushioning projections 121, and the plurality of first cushioning projections 121 extend along the direction perpendicular to the length of the main body. The plurality of first cushioning projections 121 simultaneously contact with the side of the display panel. In this way, stress concentration generated due to local contact in the display panel 2 can be mitigated.

As shown in FIGS. 2 and 3, in the display panel positioning member 1, at least one second cushioning projections 122 are formed on a surface of the cushioning portion 12 facing away from a side of the display panel 2, and the at least one second cushioning projections 122 protrude towards the stopping face of the glue frame 3. In a preferred embodiment, the second cushioning projections 122 may be plural.

Figure 7A:
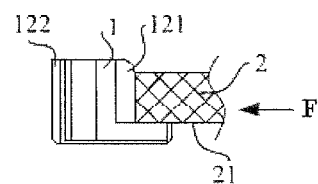
FIGS. 7a to 7c are partial and schematic views showing respective deformation states of the display panel positioning member in the display apparatus according to an embodiment of the present invention, when the display panel is subject to a force parallel to a light incidence face of the display panel.
Figure 7B:
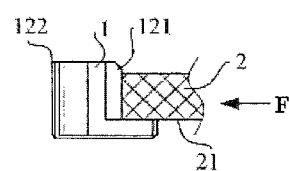
Figure 7C:
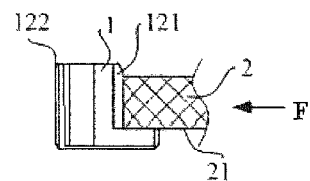

The second cushioning projections 122 can be combined with the first cushioning projections 121, the cushioning portion 12 and the supporting portion 11 to form a four-stage cushioning system. When the display panel 2 is subject to the force F (indicated by an arrow F in FIGS. 7a-7c) parallel to the light incidence face of the display panel 2, the supporting portion 11 first provides a static friction damping for the display panel 2 to form a first stage of cushioning. In a case where the force F acted on the display panel 2 is greater than the static friction damping provided by the supporting portion 11, the display panel 2 will press the cushioning portion 12 of the display panel positioning member 1. At this time, as shown in FIGS. 7a and 7b, the second cushioning projections 122 are compressed and thus deformed before the first cushioning projections 121 begin to be compressed and deformed, so that a second stage of cushioning is formed. Then, as shown in FIGS. 7b and 7c, the first cushioning projections 121 are compressed and thus deformed, so that a third stage of cushioning is formed. Finally, the whole cushioning portion 12 is compressed and thus deformed to form a fourth stage of cushioning.

Preferably, as shown in FIGS. 3-5, in the length direction of the main body, two first positioning projections 13 are provided at two end faces of the cushioning portion 12 respectively, and the two first positioning projections 13 bear against groove walls of the positioning member receiving groove 31 provided at the edge frame 32 of the glue frame 3.

In the direction perpendicular to the stopping face of the glue frame 3, at least one second positioning projections 112 are formed on a side of the supporting portion 11 facing away from the cushioning portion 12, and the at least one second positioning projections 112 bear against the groove walls of the positioning member receiving groove 31 provided at the edge frame 32 of the glue frame 3. In a preferred embodiment, the second positioning projections 112 may be plural.

The first positioning projections 13 and the second positioning projections 112 can improve stability of the assembly formed by assembling the display panel positioning member 1 and the glue frame 3.

In particular, the shock absorbing material having a high damping, used for the main body of display panel positioning member 1 according to respective embodiments of the present invention, may be silicone, rubber, foam or ethyl vinyl acetate copolymer. However, it should be noted that the present invention is not limited to this, and other suitable shock absorption materials having damping property may be used.

It should be noted that the above described embodiments are preferred embodiments of the present invention only and are not intended to limit the present invention. It would be appreciated by those skilled in the art that various changes and substitutions may be made without departing from the principle and spirit of the disclosure. Such changes and substitutions fall within the scope of the disclosure.

What is claimed is:

1. A display panel positioning member for positioning a display panel with respect to a glue frame in a display apparatus, comprising a main body made of a shock absorbing material with a damping property, a length direction of the main body being parallel to an inside face of an edge frame of the glue frame and an inside bottom face of the glue frame, wherein the main body comprises:
   a supporting portion provided between a light incidence face of the display panel and the glue frame; and
   a cushioning portion connected with the supporting portion and provided between a side of the display panel and the edge frame of the glue frame;
   wherein at least one reinforcement ribs are provided on a surface of the supporting portion facing away from the display panel.

2. The display panel positioning member according to claim 1, wherein an extending direction of each reinforcement rib is perpendicular to the length direction of the main body, and the at least one reinforcement ribs are uniformly distributed along the length direction of the main body.

3. The display panel positioning member according to claim 1, wherein at least one first cushioning projections are formed on a surface of the cushioning portion facing a side of the display panel, and the at least one first cushioning projections protrude towards the side of the display panel.

4. The display panel positioning member according to claim 3, wherein the cushioning portion is provided with a plurality of first cushioning projections, and the plurality of first cushioning projections extend along a direction perpendicular to the length direction of the main body.

5. The display panel positioning member according to claim 3, wherein at least one second cushioning projections are formed on a surface of the cushioning portion facing away from the side of the display panel, and the at least one second cushioning projections protrude towards the inside face of the edge frame of the glue frame.

6. The display panel positioning member according to claim 1, wherein,
   in the length direction of the main body, two first positioning projections are provided at two end faces of the cushioning portion respectively, and the two first positioning projections bear against groove walls of the positioning member receiving groove provided at the edge frame of the glue frame;
   in a direction perpendicular to the inside face of the edge frame of the glue frame, at least one second positioning projections are formed on a side of the supporting portion facing away from the cushioning portion, and the at least one second positioning projections bear against the groove walls of the positioning member receiving groove provided at the edge frame of the glue frame.

7. The display panel positioning member according to claim 1, wherein the shock absorbing material with a damping property is silicone, rubber, foam or ethyl vinyl acetate copolymer.

8. The display panel positioning member according to claim 1, wherein the supporting portion and the cushioning portion are connected to form the main body having a substantially L-shaped cross-section.

9. A display apparatus, comprising a glue frame and a display panel, the glue frame having an inside bottom face which contacts with a light incidence face of the display panel, and edge frames of the glue frame having inside faces which face sides of the display panel, wherein the display apparatus further comprises at least one display panel positioning members according to claim 1, and the at least one display panel positioning members are provided at the edge frames of the glue frame and between the glue frame and the display panel.

10. The display apparatus according to claim 9, wherein at least one positioning member receiving grooves are provided at the edge frames of the glue frame, and the at least one display panel positioning members are received in the at least one positioning member receiving grooves, respectively.

11. The display apparatus according to claim 9, wherein an extending direction of each reinforcement rib is perpendicular to the length direction of the main body, and the at least one reinforcement ribs are uniformly distributed along the length direction of the main body.

12. The display apparatus according to claim 10, wherein at least one first cushioning projections are formed on a surface of the cushioning portion facing a side of the display panel, and the at least one first cushioning projections protrude towards the side of the display panel.

13. The display apparatus according to claim 12, wherein the cushioning portion is provided with a plurality of first cushioning projections, and the plurality of first cushioning projections extend along a direction perpendicular to the length direction of the main body.

14. The display apparatus according to claim 12, wherein at least one second cushioning projections are formed on a surface of the cushioning portion facing away from the side of the display panel, and the at least one second cushioning projections protrude towards the inside face of the edge frame of the glue frame.

15. The display apparatus according to claim 10, wherein,
   in the length direction of the main body, two first positioning projections are provided at two end faces of the cushioning portion respectively, and the two first positioning projections bear against groove walls of the positioning member receiving groove provided at the edge frame of the glue frame;
   in a direction perpendicular to the inside face of the edge frame of the glue frame, at least one second positioning projections are formed on a side of the supporting portion facing away from the cushioning portion, and the at least one second positioning projections bear against the groove walls of the positioning member receiving groove provided at the edge frame of the glue frame.

16. The display apparatus according to claim 10, wherein the shock absorbing material with a damping property is silicone, rubber, foam or ethyl vinyl acetate copolymer.

17. The display apparatus according to claim 10, wherein the supporting portion and the cushioning portion are connected to form the main body having a substantially L-shaped cross-section.

\* \* \* \* \*